United States Patent
Koda et al.

[19]

[11] Patent Number: 6,103,174
[45] Date of Patent: Aug. 15, 2000

[54] MOLD CLAMPING METHOD FOR STRAIGHT HYDRAULIC MOLD CLAMPING APPARATUS

[75] Inventors: Toshiyasu Koda; Masashi Suganuma; Takahiro Kobayashi; Mamoru Miyagawa, all of Sakakimachi, Japan

[73] Assignee: Nissei Plastic Industrial Co., Ltd., Japan

[21] Appl. No.: 09/133,263

[22] Filed: Aug. 13, 1998

[30] Foreign Application Priority Data

Aug. 18, 1997 [JP] Japan .................................. 9-221450

[51] Int. Cl.⁷ .................................................. B29C 45/80
[52] U.S. Cl. ..................... 264/328.1; 425/590; 425/451.2
[58] Field of Search ............................ 264/328.1, 40.1, 264/40.5; 425/135, 150, 451.2, 451.9, 590, 595

[56] References Cited

U.S. PATENT DOCUMENTS

| | | |
|---|---|---|
| 4,158,327 | 6/1979 | Aoki .......................................... 425/590 |
| 4,861,259 | 8/1989 | Takada ...................................... 425/590 |
| 4,865,537 | 9/1989 | Shima ....................................... 425/590 |
| 4,917,840 | 4/1990 | Harada et al. ........................... 264/40.5 |
| 4,925,618 | 5/1990 | Takada ...................................... 425/590 |
| 4,981,426 | 1/1991 | Katashi ..................................... 425/150 |
| 5,129,806 | 7/1992 | Hehl ......................................... 425/590 |
| 5,609,801 | 3/1997 | Arai .......................................... 425/150 |
| 5,906,778 | 5/1999 | Arai et al. ................................ 264/40.1 |

Primary Examiner—Jill L. Heitbrink
Attorney, Agent, or Firm—Ostrolenk, Faber, Gerb & Soffen, LLP

[57] ABSTRACT

A mold clamping method for a straight hydraulic mold clamping apparatus, wherein supply of mold clamping oil to the rear oil chamber of the mold clamping cylinder starts immediately before completion of slowing down of the mold closing process using rapid-moving cylinders, and raising the mold clamping force successively starts simultaneously with completion of the mold closing.

2 Claims, 2 Drawing Sheets

MOLD CLAMPING METHOD FOR STRAIGHT HYDRAULIC MOLD CLAMPING APPARATUS

BACKGROUND OF THE INVENTION

1. Field of the Invention

The present invention relates to a mold clamping method for a straight hydraulic mold clamping apparatus, which can be used for molding machines such as injection molding machines, die-cast machines, or the like.

2. Background Art

Straight hydraulic mold clamping apparatuses for accelerating the speed of opening or closing mold halves by reducing oil resistance of a mold clamping piston which moves inside a mold clamping cylinder is already known. The straight hydraulic mold clamping apparatus has two oil chambers, which are located in the front and the rear of the cylinder respectively and communicate with each other via passages drilled through the mold clamping piston inserted into the cylinder, as well as a disk valve in the rear oil chamber for closing or opening the passage, engaged movably in the axial direction with the perimeter of the rear of a mold clamping ram. The straight hydraulic mold clamping apparatus also has an valve operation oil chamber disposed at the section where the disk valve is engaged with the mold clamping ram.

In the straight hydraulic mold clamping apparatus with a built-in disk valve, rapid-moving cylinders, parallel disposed in the rear of the mold clamping ram or along the side of the mold clamping cylinder, performs the opening or closing of the mold by moving the mold clamping ram together with the mold clamping piston and the disk valve.

Besides, after the mold closing is completed, with the rapid mold closing speed caused by the rapid-moving cylinders slowed down to a low speed/low pressure operation, communication between the front and the rear oil chambers is shut down by closing the passages through the mold clamping piston by the disk valve, and the pressure within the rear oil chamber, to which mold clamping oil is supplied, is raised to generate a large mold clamping force.

According to the mold clamping method, the rear oil chamber, being expanded as the mold clamping piston moves forward, is filled with oil flowing in from the front oil chamber which is being shrunk. However, there is a difference between the expansion ratio of the rear oil chamber caused by the rapid movement of the mold clamping piston and the inflow ratio of the oil flowing into the rear oil chamber caused by pressure of the mold clamping piston onto the front oil chamber. The difference, which varies according to the mold closing speed, is usually in a state of negative pressure due to lack of oil in the rear oil chamber.

Therefore, oil supply to the rear oil chamber after completion of the mold closing takes a stepwise operation as follows:

firstly, the supplied oil is consumed for resolving the negative pressure, the oil is compressed and the compression amount is compensated, then pressure in the rear oil chamber is raised by the supplied mold clamping oil.

The result is such that even though the mold closing is performed at a high speed, it takes time to raise the mold clamping pressure after completion of the mold closing, and injection charge of resin into the mold must wait until the mold clamping force reaches a predetermined pressure. Thus it is difficult to shorten the mold clamping time when high cycle molding is expected and this is the problem to be solved.

SUMMARY OF THE INVENTION

It is an object of the present invention, which has been devised to solve the above mentioned problems, to provide a mold clamping method for a straight hydraulic mold clamping apparatus wherein, negative pressure in the rear oil chamber is already resolved at the completion of the mold closing, compensation of the oil compression amount is performed simultaneously with completion of the mold closing, and raising the mold clamping force pressure can be started immediately.

The present invention based on the above object is a mold clamping method for a straight hydraulic mold clamping apparatus comprising, a rapid-moving cylinder having a piston rod inside;

a mold clamping cylinder comprising a mold clamping ram equipped in the cylinder, a mold clamping piston which partitions the inside of the cylinder into a front oil chamber and a rear oil chamber communicating with each other via a passage drilled through the piston, a disk valve for closing or opening the passage, engaged with the mold clamping ram at the rear oil chamber movably in the axial direction, an valve operation oil chamber disposed at the section where the disk valve is engaged with the mold clamping ram, a supply passage for supplying oil to the valve operation oil chamber, and a supply passage of old clamping oil disposed in the rear oil chamber;

a fixed platen on which a mold half is mounted; and a movable platen on which another mold half is mounted, in which the piston rod is connected to the movable platen so that the movable platen can be moved to open or close the mold, and the mold clamping ram is connected to the movable platen so that the movable platen can be clamped, the mold clamping method comprising the steps of:

closing the movable platen by the rapid-moving cylinders to close the mold halves and to transfer oil in the front oil chamber to the rear oil chamber via the passage being open;

slowing down the rapid-moving cylinder for completion of the mold closing process; and starting supply of mold clamping oil via mold clamping oil supply passage to the rear oil chamber immediately before completion of slowdown of the rapid-moving cylinders to start raising the oil pressure for mold clamping force simultaneously with completion of the mold closing.

Thus, negative pressure in the rear oil chamber is already resolved at completion of the mold closing process and raising the mold clamping force pressure is performed simultaneously with completion of the mold closing process, which enables high cycle molding.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
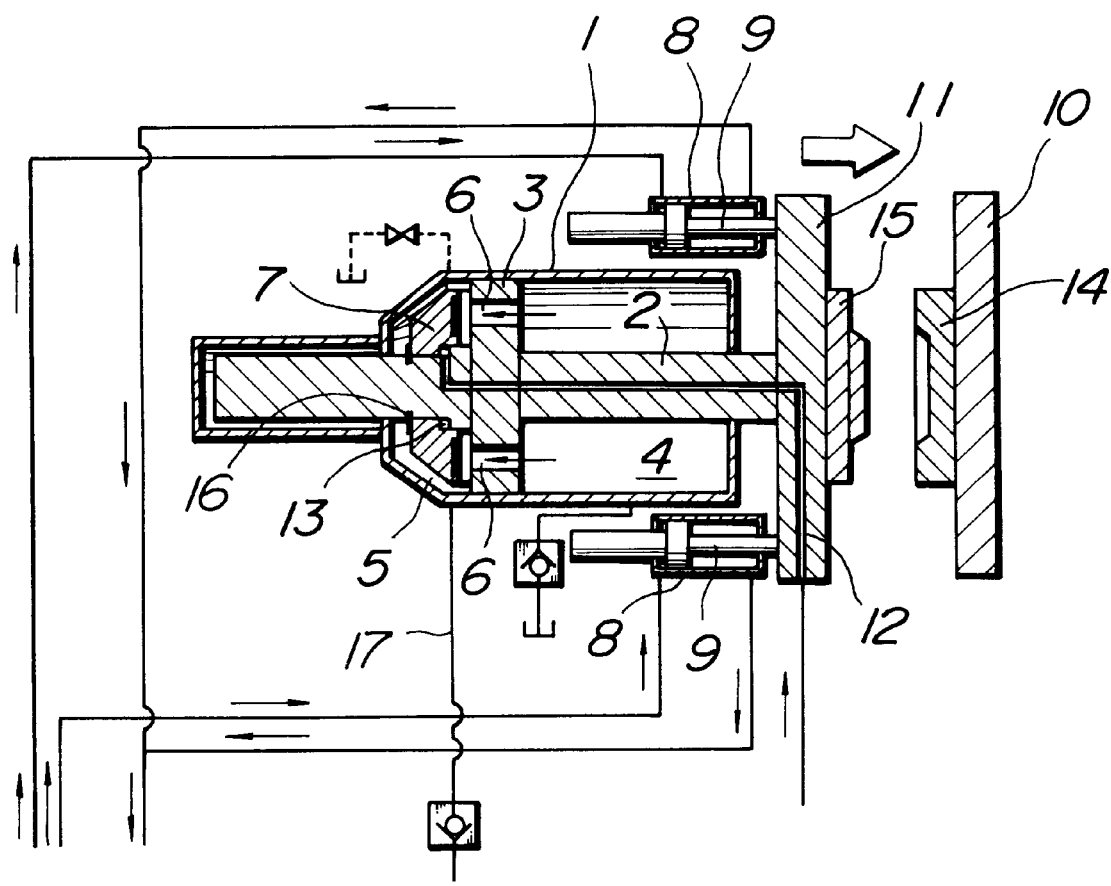
FIG. 1 is a schematic diagram illustrating a status at the mold opening of a straight hydraulic mold clamping apparatus to which the mold clamping method according to the present invention is applied.
Figure 2:
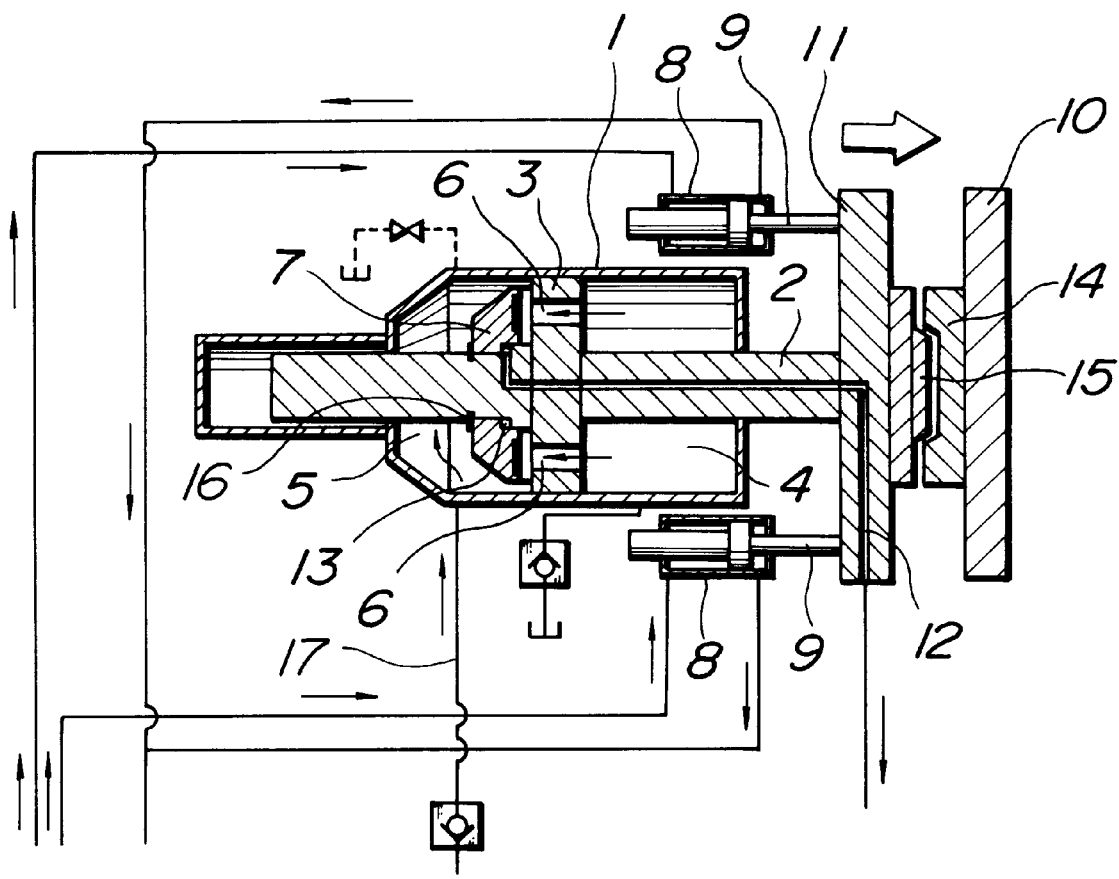
FIG. 2 is a schematic diagram illustrating a status immediately before the mold closing of a straight hydraulic mold clamping apparatus to which the mold clamping method according to the present invention is applied.

The present invention is described in detail hereinafter with reference to embodiment(s) shown in the accompanying drawings.

In the drawings, reference numeral 1 denotes a mold clamping cylinder, 2 a mold clamping ram, 3 a mold clamping piston, 4 a front oil chamber and 5 a rear oil chamber. Inside of the clamping cylinder is partitioned into the front oil chamber 4 and the rear oil chamber 5 by the mold clamping piston 3 integrally formed around the rear part of the mold clamping ram 2. The rear oil chamber 5 has a mold clamping oil supply passage 17 for supplying a mold clamping oil.

Besides, reference numeral 6, 6 are a plurality of passages drilled through the mold clamping piston 3, through which the oil chambers communicate with each other. Reference numeral 7 denotes a disk valve provided at the periphery of the clamping ram 2 in the rear oil chamber and the passages 6, 6 are closed by the disk valve 7 at the time of mold clamping.

In the present embodiment, rapid-moving cylinders 8, 8 are parallel disposed along both sides of the cylinder 1 and have respective piston rods 9, 9 inside thereof. Reference numeral 10 denotes a fixed platen provided with a mold half and 11 is a movable platen provided with another mold half. The mold clamping ram 2 is connected, together with the piston rods 9, 9 of the rapid moving cylinders 8, 8, to the back side of the movable platen 11 disposed oppositely to the fixed platen 10. Therefore the mold clamping ram 2 moves back and forth inside the mold clamping cylinder together with the mold clamping piston 3 and the disk valve 7, by the movement of the piston rods 9, 9 via the movable platen 11.

Here the perimeter of the rear of the mold clamping ram 2 is formed to be a step, with which the disk valve 7 is engaged movably in the axial direction. The disk valve 7 comprises an annular protrusion, and the engagement section between the ring-shaped protrusion of the disk valve 7 and the step of the mold clamping ram 2 is formed as a valve operation oil chamber 13 connected to an oil supply passage 12 introduced from the movable platen 11 via the mold clamping ram 2. By supplying oil to the valve operation oil chamber 13, the disk valve 7 is pushed backward as far as it contacts a stopper 16 at the perimeter of the mold clamping ram 2, for opening the passages 6, 6. Closing of the passages 6, 6 is performed utilizing the pressure difference caused by the difference of pressure receiving surface areas of both sides of the disk valve 7.

Now the processes of mold closing and mold clamping will be described in the following.

In the mold-open state shown in FIG. 1, since oil is supplied to rear oil chambers of the rapid moving cylinders 8, 8, while the supplied oil pressure in the valve operation oil chamber 13 is maintained, the piston rod 9, 9 is forwarded to move the movable platen 11 toward the fixed platen rapidly. The rapid movement narrows the clearance between a fixed mold half 14 of the fixed platen 10 and a movable mold half 15 of the movable platen 11. At the same time, the mold clamping ram 2, being pulled by the movable platen 11, moves forward rapidly inside the mold clamping cylinder 1 together with the disk valve 7, by which the passages of the mold clamping piston 3 are kept open.

The front oil chamber 4 is shrunk as the mold clamping piston 3 moves forward, whereas the rear oil chamber 5 is expanded. At the same time, oil in the front oil chamber 4, being pressed by the mold clamping piston 3, flows out of the passages 6, 6 into the rear oil chamber 5. Therefore no oil flowing resistance exists even though the front oil chamber 4 is shrunk, letting the mold closing proceeds at a high speed.

When the rapid mold closing reaches a predetermined position, the forward movement by the rapid moving cylinders are slowed down to switch the process to a low speed/low pressure mold closing. At the point of time immediately before completion of the slowdown of the low speed mold closing (the point of time when both mold-halves contact each other and are completely closed), in other words when the clearance between the mold-halves becomes as close as two millimeters, a mold clamping step is started. The mold clamping step may be carried out by starting the supply of mold clamping oil from the mold clamping oil supply passage 17 to the rear oil chamber 5.

Although the rear oil chamber 5 is filled with oil flowing in from the front oil chamber 4, there is a difference between the expansion ratio of the rear oil chamber caused by the rapid movement of the mold clamping piston 3 and the inflow ratio of the oil caused by pressure of the mold clamping piston 3, causing a state of negative pressure inside the rear oil chamber 5 due to lack of oil inside, even when the process is being slowed down. The mold clamping oil supplied to the rear oil chamber 5 immediately before completion of the slowing down is consumed for filling the shortage of oil caused by expansion of the rear oil chamber 5. Therefore inflow of oil from the passages 6, 6 is not interfered even after the supply, and the mold closing process is completed with the movable platen 11 moving at a slow speed to a position where both molds are completely closed because the disk valve 7 is kept open by the oil in the valve operation oil chamber 13.

When completing the mold closing, the negative pressure state in the rear oil chamber 5 is resolved in a short time period before both mold halves are completely closed, by filling the shortage inside with mold clamping oil which has been continuously supplied. The back of the disk valve 7 has a wider pressure receiving area than that of the front side facing the mold clamping piston 3, causing difference of oil pressure applied to the disk valve 7 from the rear oil chamber 5. Therefore, when a free state is caused by draining the oil in the valve operation oil chamber 13 simultaneously with the mold closing, the disk valve 7 will immediately move toward the mold clamping piston 3 to have an intimate contact with the back side of the piston, closing the passages 6, 6 and completely separating the rear oil chamber 5 from the front oil chamber 4.

Simultaneously with the separating, oil compression and compensation of the oil compression amount occur in the rear oil chamber 5, and the mold clamping oil successively and automatically starts raising the clamping pressure inside the rear oil chamber 5 immediately after completion of the mold closing, eventually reaching a predetermined mold clamping force.

As a result, the time required for resolving the negative pressure after completion of the mold closing can be cut, shortening the time interval between completion of the mold closing and reaching the predetermined mold camping force, by at least the reduced time. Thus shifting to the injection charge process can be advanced, enabling high cycle molding with a straight hydraulic mold clamping apparatus.

Here, the starting time of oil supply to the rear oil chamber 5 can be set by devices such as a timer, a limit switch, a position sensor, or the like. When using a timer, supply of the mold clamping oil may be started at time up of the timer, having been initiated simultaneously with starting of the slow down. In the case of a limit switch or a position sensor, supply of the mold clamping oil may be started with the switch or the sensor disposed at a predetermined position before the complete mold closing position being the reference position. In either case, setting of the start time can be easily done with no difficulties.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A mold clamping method for a straight hydraulic mold clamping apparatus which comprises:

a rapid-moving cylinder having a piston rod inside;

a mold clamping cylinder comprising a mold clamping ram equipped in the cylinder, a mold clamping piston which partitions the inside of the cylinder into a front oil chamber and a rear oil chamber communicating with each other via a passage drilled through the piston, a disk valve for closing or opening said passage, engaged with the mold clamping ram at the rear oil chamber movably in the axial direction, an valve operation oil chamber disposed at the section where said disk valve is engaged with the mold clamping ram, a supply passage for supplying oil to the valve operation oil chamber, and a supply passage of old clamping oil disposed in the rear oil chamber;

a fixed platen on which a mold half is mounted; and a movable platen on which another mold half is mounted, in which said piston rod is connected to the movable platen so that the movable platen can be moved to open or close the mold, and the mold clamping ram is connected to the movable platen so that the movable platen can be clamped, said mold clamping method comprising the steps of:

closing the movable platen by the rapid-moving cylinders to close the mold halves and to transfer oil in the front oil chamber to the rear oil chamber via said passage being open;

slowing down the rapid-moving cylinder for completion of the mold closing process; and starting mold clamping immediately before completion of slowdown of the rapid-moving cylinders to start raising the oil pressure for mold clamping force simultaneously with completion of the mold closing.

2. The mold clamping method for a straight hydraulic mold clamping apparatus according to claim 1, wherein the mold clamping step is carried out by starting supply of mold clamping oil via mold clamping oil supply passage to said rear oil chamber.

* * * * *